Nov. 8, 1955     M. R. COOLEY     2,722,799
COMBINED RAKING TOOTH AND MOUNTING
STRUCTURE THEREFOR
Filed July 16, 1951
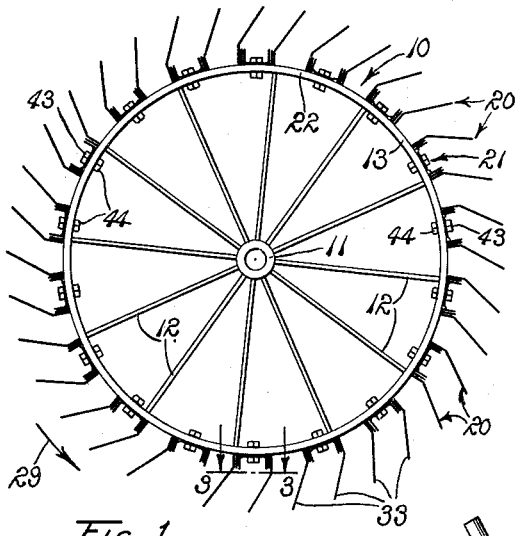
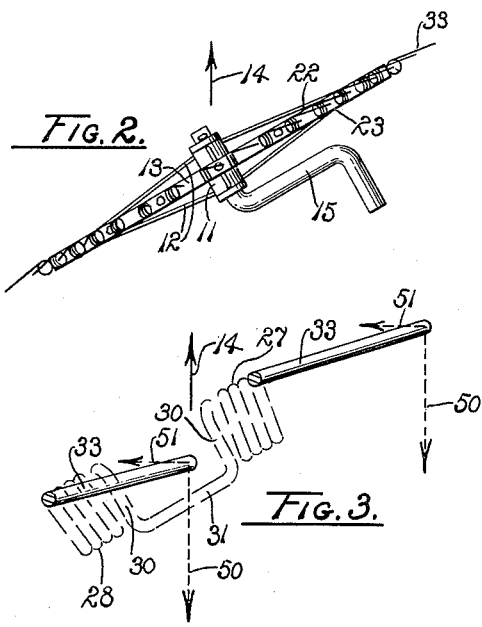
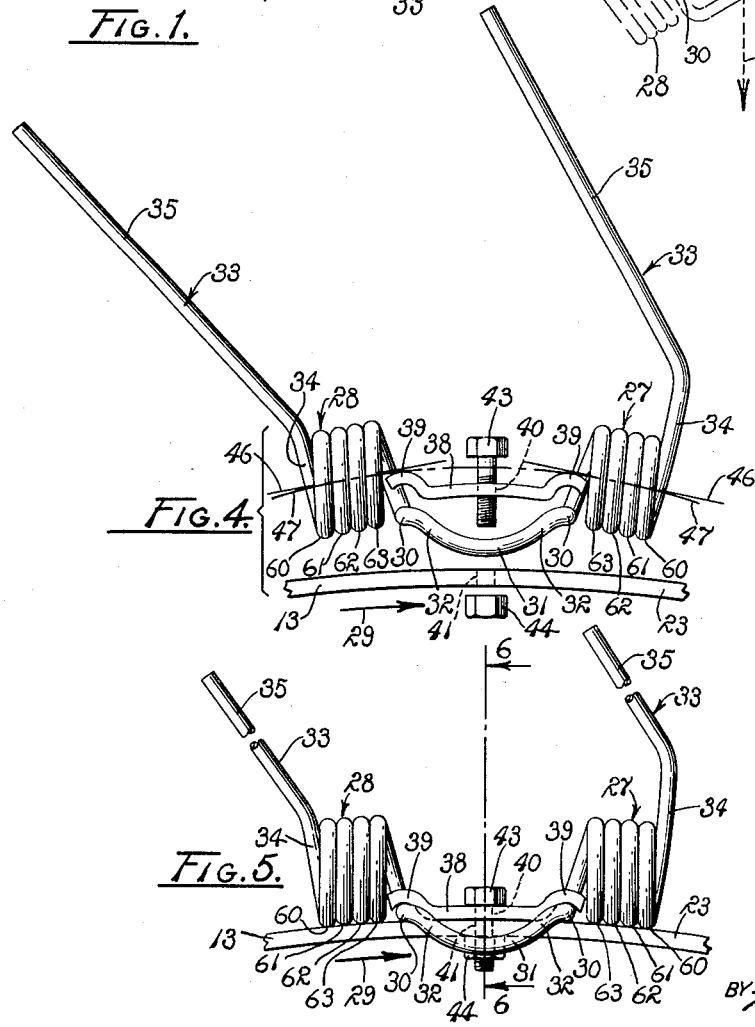
MORRIS R. COOLEY
INVENTOR
ATTORNEYS
HUEBNER, BEEHLER,
WORREL & HERZIG United States Patent Office 2,722,799
Patented Nov. 8, 1955

2,722,799

COMBINED RAKING TOOTH AND MOUNTING STRUCTURE THEREFOR

Morris R. Cooley, Tulare, Calif., assignor to Melvin A. Morrill, Laton, Calif.

Application July 16, 1951, Serial No. 236,951

3 Claims. (Cl. 56—400)

The present invention relates to crop engaging teeth for rakes, windrow turners, tedders, and the like and more particularly to a combined resilient raking tooth and mounting structure therefor.

The problems incident to the provision of resilient raking teeth of satisfactory durability in rakes, windrow turners, tedders, and the like are well known and have received careful attention for many years. These problems have been found to be aggravated in side delivery rakes employing a plurality of freely rotatable raking wheels mounted in echelon for earth traversing movement in substantially erect planes obliquely related to the direction of travel such as that shown and described in United States Patent No. 2,447,354, issued August 17, 1948 to Melvin A. Morrill entitled "Rotary Side Delivery Rake" and United States Patent No. 2,472,260, issued June 7, 1949 to Melvin A. Morrill, entitled "Side Delivery Rake." Not only do the teeth in such rakes gather ground-supported crops but they also serve, through crop and/or earth engagement, to rotate the wheels. Because of the compound stresses imposed on such teeth and the vibration to which they are subjected, teeth which are of adequate durability, in for example reel and basket type side delivery rakes, rapidly crystallize when employed in side delivery wheel rakes of the type described.

An object of the present invention is to provide a combined raking tooth and mounting structure therefor of improved durability.

Another object is to provide an improved resilient raking tooth especially suited for use in rotary side delivery wheel rakes and possessing advantages over conventionally employed teeth in rakes, windrow turners, tedders and the like generally.

Another object is to provide a combined raking tooth and mounting structure therefor possessing improved vibration damping effects.

Another object is to provide a combined raking tooth and mounting structure of the character described in the preceding paragraph in which the damping effect is incident to frictional engagement between the tooth and mounting structure, which engagement progressively travels along the tooth incident to tooth flexing and results in variation of frequency of tooth vibration as well as damping of such vibration and thus minimizes harmonic oscillation and resultant tendencies to crystallize.

Another object is to provide a combined tooth and mounting structure therefor of the character described which when employed in rotary side delivery rakes achieves dependable crop engagement and release.

Further objects are to provide improved form, elements, and arrangements thereof in a combined raking tooth and mounting structure therefor that is economical to produce, simple, durable and fully effective in accomplishing its intended purposes.

In the drawing:

Fig. 1 is an axial elevation of a raking wheel of the type employed in rotary side delivery wheel rakes having peripherally mounted therein raking teeth embodying the principles of the present invention.

Fig. 2 is a plan view of the structure shown in Fig. 1 illustrating in association therewith means for mounting the wheel for free rotational movement and earth traversing travel along a line represented by an arrow shown therein.

Fig. 3 is an enlarged fragmentary section taken on line 3—3 of Fig. 1 showing in dashed line fragmentarily superimposed portions of the raking tooth and mounting structure therefor.

Fig. 4 is an enlarged exploded view of a fragmentary portion of the raking wheel, raking tooth, and mounting means therefor.

Fig. 5 is a side elevation of the structure shown in Fig. 4 in assembled relation, tine portions of the raking tooth being foreshortened for illustrative convenience.

Fig. 6 is a section taken on line 6—6 of Fig. 5.

Referring in greater detail to the drawing:

Inasmuch as the subject invention was developed in connection with the solution of problems of durability and economy in raking teeth and mounting structures therefor in rotary side delivery rakes of the wheel type, the invention is illustrated in connection with such a wheel, it being understood, however, that the invention possesses utility in other operational environments. A raking wheel is indicated generally at 10, having a hub 11, radial spokes 12, and a transversely flat treaded rim 13. As taught in the above identified United States Patents to Melvin A. Morrill, the wheel is mounted in echelon with a plurality of similar wheels, not shown, for free rotational movement in a substantially erect plane obliquely related to the direction of travel represented by the arrow 14 in Fig. 2. The wheel is usually mounted for independent elevational movement on a crank axle 15, shown in Fig. 2, or other suitable means.

Although it has been well known to provide spring teeth each employing a pair of coaxially disposed helical wire coils having inner ends interconnected to provide support for the coils and outer ends extended in substantially parallel relation to provide crop engaging tines, which teeth possess a measure of visual similarity to the raking tooth of the present invention, such conventional teeth have proved entirely unsatisfactory when employed in rotary side delivery wheel rakes. The stresses imposed upon the tines of such conventional teeth and the vibration to which they are subjected cause the rapid formation of a carbon block at the juncture of the inner ends of the coils with the interconnecting portions thereof. Extensive experimentation has been conducted in an effort to damp the vibration and so distribute the stresses imposed upon such teeth as to minimize the crystallization thereof. Such efforts have resulted in the development of well known teeth of the type described having resilient blocks for cushions mounted concentrically within the coils. Because of the compound stresses imposed upon the tines of such teeth in rotary side delivery wheel rakes, such means for damping the vibration have proved unsuccessful and merely succeed in shifting the position of most frequent breakage.

Teeth of the present invention are indicated generally at 20 comprising a single length of spring wire material. The teeth are mounted on the rim 13 characterizing mounting members generally by mounting means 21 subsequently described in greater detail. It will be apparent that the wheel 10 during earth traversing movement has a laterally and forwardly disposed side 22 and an oppositely laterally and rearwardly disposed side 23.

Each of the teeth provides a forward helical coil 27 and a rearward helical coil 28 in endwardly adjacent relation axially in the plane of the wheel 10. The forward coil consists of a plurality of clockwise convolutions axially progressive in the direction of rim rotation indicated by the arrow 29. The rearward coil 28 consists of a plurality of counterclockwise convolutions axially progressive in said direction of rim rotation. The innermost convolution of each coil is extended transversely of the rim, as indicated at 30, rearwardly relative to the direction of earth traversing travel of the wheel. The extensions 30 are interconnected by a central portion or shank 31. As evident in Figs. 4 and 5, the shank is endwardly extended from the inner end of each of the coils 27 and 28 and appreciably radially of the coil, as indicated at 32. The shank 31 is engaged with the laterally rearwardly disposed side of the rim. Crop engaging tines 33 are extended tangentially from the outer ends of the coils outwardly from the laterally forwardly disposed side of the rim, as at 34, and thence angularly rearwardly of the direction of wheel rotation, as shown at 35. When the teeth are mounted in position their portions 34 are in substantially parallel relation as are their angularly related portions 35. As most clearly evident in Fig. 6, the tines are preferably slightly rearwardly directed from the wheel relative to the line of earth traversing movement represented at 14.

The mounting means 21 consist of an arcuate spring strap 38 of a preformed curvature having a radius approximating the radius of curvature of the peripheral mounting surface of the rim 13, as shown in Fig. 4. Opposite ends 39 of the strap are formed to fit downwardly over the transverse extensions 30 of the inner ends of the coils 27 and 28. A bore 41 is formed centrally through the rim 13 at each position in which it is desired to mount a raking tooth 20. A bore 40 is formed through the strap substantially midway between the ends 39 thereof.

A single bolt 43 is extended through the bores 40 and 41 and a nut 44 screw-threadedly mounted on the inner end of the bolt and tightened against the inner surface of the rim to compress the central portion of the strap 38 against the periphery of the rim, as shown in Fig. 5.

By comparing the structure shown in Figs. 4 and 5, it will be evident that the coils 27 and 28 and the central portion 31 of the tooth 20 are preformed with the axes of the coils, represented at 46, tangentially related to a circle, represented at 47, of a radius approximating by less than the radius of the wheel whereby the compressing of the strap 38 into rim engagement in mounting the tooth presses the convolutions of the coils into frictional rim engagement with the outermost convolutions engaged with the rim with the greatest pressure and the relatively inward convolutions with progressively less pressure. It will also be apparent that the mounting of the tooth 20 on the rim 13 under compression displaces the coils 27 and 28 from their predetermined axial angular relation and draws the tines 33 into substantially parallel relation from their preformed outwardly slightly divergent relation. The tension to which the bolt 43 is subjected in compressing the strap 38 against the rim 13 obviates the necessity for any lock washer or other locking means for retaining the nut 44 in tightened position on the bolt.

The engagement of the central portion of shank 31 with the edge of the rim 13 precludes twisting of the teeth from the mounted position shown during operation and acts as a brace in withstanding tortional stresses placed on the coils by the outwardly extended tines 33, as will be evident from an observation of Fig. 6.

*Operation*

The operation and utility of the present invention is believed to be clearly apparent and is briefly summarized at this point.

The wheel 10 is caused to move in earth traversing travel along the lines represented by the arrow 14 by any suitable structure such as that shown in the above identified patents to Melvin A. Morrill. During earth traversing movement, the tines 33 engage hay or other rakable substance on the ground and because of the oblique disposition of the wheel 10 relative to the line of travel rotate the wheel in the direction indicated by the arrow 29.

Fig. 3 may be visualized as a view looking downwardly on the tines 33 while in engagement with the earth or rakable substance, now shown, during earth traversing travel of the wheel and rotational movement thereof. Rearward drag of the rakable substance on the tines incident to earth traversing movement of the wheel 10 is represented by vectors 50. The rearward drag on the teeth at the bottom of the wheel rotates the wheel and because of the oblique disposition thereof relative to the line of travel, rakable substance engaged by the teeth is directed laterally of the line of travel. The resistance of the rakable substance to lateral movement exerts a force on the tines laterally of the direction of movement represented by the vectors 51. It will be evident that the vectors 50 tend to urge their respective tines in a direction tightening the convolutions of said tines respective coils 27 and 28. It will also be apparent that the vectors 51 tend to urge the tines in a direction imposing stress on the coils tending to distort them axially. These compound forces represented by the vectors 50 and 51 fully illustrate the difficulties of providing durable teeth in rotary side delivery rakes of the wheel type.

As the wheel 10 is rotated, the teeth 20 are successively traveled downwardly into engagement with rakable substance on the ground and successively drawn upwardly therefrom. The angular displacement of the portions 35 of the teeth 20 from true radial relation to the wheel 10 causes said portions to snag rakable substance when initially engaged and gravitationally to release such substance when upwardly traveled therefrom with said portions in substantially vertical position.

For descriptive convenience, the portions of the endwardmost convolutions of the coils 27 and 28 in frictional engagement with the rim 13 are identified at 60 and the successive inwardly adjacent convolutions in frictional engagement with the rim identified at 61, 62 and 63, respectively. It will be recalled that the convolutions 60 are engaged with the rim with the greatest pressure and the convolutions 61, 62 and 63 with progressively less pressure. If the coils 27 and 28 are axially extended tangentially from the rim, as is known in conventional teeth, the vibration of the tines and coils freely extended from the rim is excessive and the teeth broken by crystallization after only relatively brief use at the inner ends of the coils. The frictional engagement of the convolutions 60 to 63 damps such vibration and obviates the imposition of the vibration stresses on localized points at the inner ends of the coils.

As the tines 33 are flexed rearwardly of the line of travel 14 by engagement with rakable substance or the earth, their respective coils 27 and 28 are tightened. Tightening of the convolutions reduces the over all diameter thereof slightly and modifies the extent of frictional engagement of the successive convolutions of the coils with the rim. When the tines are in relaxed position, the convolutions 60 have the greatest frictional engagement. During rearward drag of the tines the point of greatest friction passes from the convolutions 60 successively to the convolutions 61, 62 and 63. Although the convolutions exercise a collective damping effect by their combined frictional engagement, the progressive travel of the point of greatest friction minimizes harmonic vibration in the tines and structural failure incident thereto. The teeth of the present invention are conveniently mounted and replaced by the simple employment of the bolt 43. The teeth and the mounting structure have proved more economical than comparable structures previously employed and of such durability that replacement frequency of the teeth in rakes of the character described has been reduced to a small fraction of that previously experienced.

While the coils 27 and 28 have been described as having axes 46 tangentially related to the circle 47 of a radius less than the radius of the wheel 10, the significant feature is that the coils are compressed into axially modified relation whereby the convolutions are brought into the described frictional engagement with the rim. It will be apparent that in reel and basket side delivery rakes and in other operational environments it may be desirable to mount the coils against a flat, angular, or other mounting surface of specialized form. In such instance the teeth are so performed that the axes thereof are angularly related to a greater extent when relaxed than when clamped against the mounting surface whereby the outermost convolutions are most forcefully pressed against the mounting surface and the successively inwardly adjacent convolutions progressively less forcefully pressed thereagainst.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a raking wheel of a predetermined radius mounted for earth traversing travel in a substantially erect plane in a direction oblique to the plane of the wheel whereby the wheel has a forwardly and laterally disposed side and an oppositely laterally and rearwardly disposed side, said wheel having a transversely flat treaded rim and being mounted for free rotational movement; a plurality of raking teeth each consisting of a single length of spring wire material; and means mounting the raking teeth in outwardly extending positions on the rim of the wheel for crop engagement whereby the wheel is rotated during earth traversing movement with the top of the rim traveled laterally and forwardly of the direction of earth traversing movement; the raking teeth each comprising a forward helical coil and a rearward helical coil in endward adjacent relation having axes in a common plane oblique to the direction of travel substantially parallel to the wheel, the forward coil consisting of a plurality of clockwise convolutions axially progressive in the direction of rim rotation and the rearward coil consisting of a plurality of counter-clockwise convolutions axially progressive in said direction of rim rotation, the inwardly adjacent convolutions of the coils being extended transversely of the rim of the wheel and having rearward end portions interconnected by a continuous central portion of the tooth fitted against the laterally rearwardly disposed edge of the rim, and crop engaging tines extended substantially tangentially from the outer ends of the coils outwardly from the laterally and forwardly disposed side of the rim, the coils and the central portions of the teeth being preformed with the axes of the coils of each tooth tangentially related to a common circle of a radius approximating but less than the radius of the wheel, and the raking teeth mounting means overlaying the adjacent innermost convolutions of the adjacent coils of each tooth and compressing the convolutions of the coils into frictional rim engagement with the outermost convolutions engaged with the rim with the greatest pressure and the relatively inward convolutions with progressively less pressure.

2. In combination with a raking wheel of predetermined radius mounted for earth traversing travel in a substantially erect plane in a direction oblique to the plane of the wheel whereby the wheel has a forwardly and laterally disposed side and an oppositely laterally and rearwardly disposed side, said wheel having a transversely flat treaded rim and being mounted for free rotational movement in rolling action over earth traversed; a plurality of raking teeth each consisting of a single length of spring wire material comprising a forward helical coil and a rearward helical coil in endward adjacent relation axially in the plane of the wheel, the forward coil consisting of a plurality of clockwise convolutions axially progressive in the direction of rim rotation and the rearward coil consisting of a plurality of counter-clockwise convolutions axially progressive in said direction of rim rotation, the inwardly adjacent convolutions of the coils providing portions extended transversely of the rim of the wheel and having ends adjacent to the rearwardly laterally disposed edge of the wheel interconnected by a continuous central portion of the tooth engaged with said rearwardly laterally disposed edge, the coils and the central portions of the teeth being preformed with the axes of the coils of each tooth tangentially related to a common circle of a radius approximating but less than the radius of the wheel, and crop engaging tines extended substantially tangentially from the outer ends of the coils outwardly from the wheel from the laterally and forwardly disposed sides of the coils and thence angularly rearwardly of the direction of wheel rotation and rearwardly of the direction of earth traversing movement of the wheel; and means engageable with the portions of the inwardly adjacent convolutions of the coils extended transversely of the rim mounting the raking teeth on the rim of the wheel with the outermost convolutions of the coils frictionally engaged with the rim of the wheel with the greatest pressures and the successively inwardly adjacent convolutions with progressively reduced pressures.

3. In a side delivery rake having a raking wheel of predetermined radius mounted for earth traversing movement in a substantially erect plane in a direction oblique to the plane of the wheel whereby the wheel has a forwardly and laterally disposed side and an oppositely laterally and rearwardly disposed side, said wheel being mounted for free rotation about an axis concentric thereto obliquely disposed to said direction of travel, a plurality of raking teeth each consisting of a single length of spring wire material providing a forward helical coil and a rearward helical coil in endward adjacent relation axially in the plane of the wheel, the inwardly adjacent convolutions of the coil being extended transversely of the rim of the wheel and having end portions interconnected by a continuous central portion of the tooth engaged against the wheel, and a crop engaging tine continuous with the outermost convolution of each coil substantially tangentially extended from its respective coils outwardly from the laterally forwardly disposed side of the rim, and mounting means mounted on the wheel engaging the innermost convolutions of the teeth mounting the teeth in position on the wheel for crop engagement whereby the wheel is rotated during earth traversing movement with the top of the rim traveled laterally and forwardly of the direction of earth traversing movement; the improvement which comprises the provision of the forward coil of each tooth of a plurality of clockwise convolutions axially progressive in the direction of rim rotation and the rearward coil of each tooth of a plurality of counter-clockwise convolutions axially progressive in said direction of rim rotation whereby rearward drag of the tines incident to crop engagement constricts the outermost convolutions of their respective coils, and the central portion of each tooth being preformed with the axes of the coils of its respective tooth tangentially related to a common circle of a radius approximating but less than the radius of the wheel whereby the mounting means presses the convolutions of the coils into frictional engagement with the wheel with the outermost convolutions engaged with the wheel with the greatest pressure and the relatively inward convolutions with progressively less pressure and whereby rearward drag of the tines appreciably reduces the pressure of the outermost convolutions of their respective coils against the wheel automatically shifting the position of most forceful wheel engagement between the convolutions incident to variation in rearward drag on the tines.

References Cited in the file of this patent

UNITED STATES PATENTS

| | | | |
|---|---|---|---|
| 1,978,717 | Oppenheim | Oct. 30, | 1934 |
| 2,256,829 | Hyman | Sept. 23, | 1941 |
| 2,459,961 | Pollard | Jan. 25, | 1949 |
| 2,527,887 | Martin | Oct. 31, | 1950 |